Aug. 17, 1926. 1,595,984
A. AMES, JR
PHOTOGRAPH AND ART OF MAKING THE SAME
Filed March 14, 1921
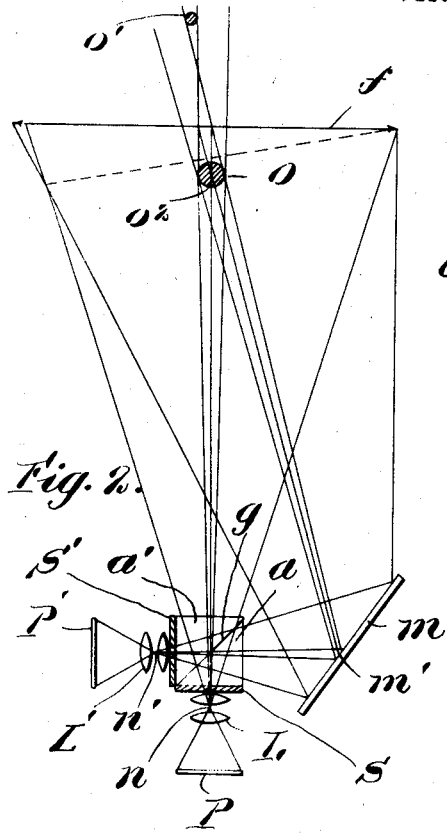
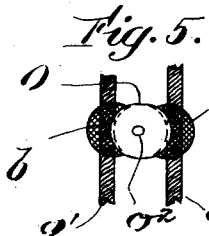
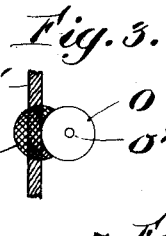
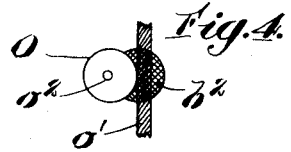
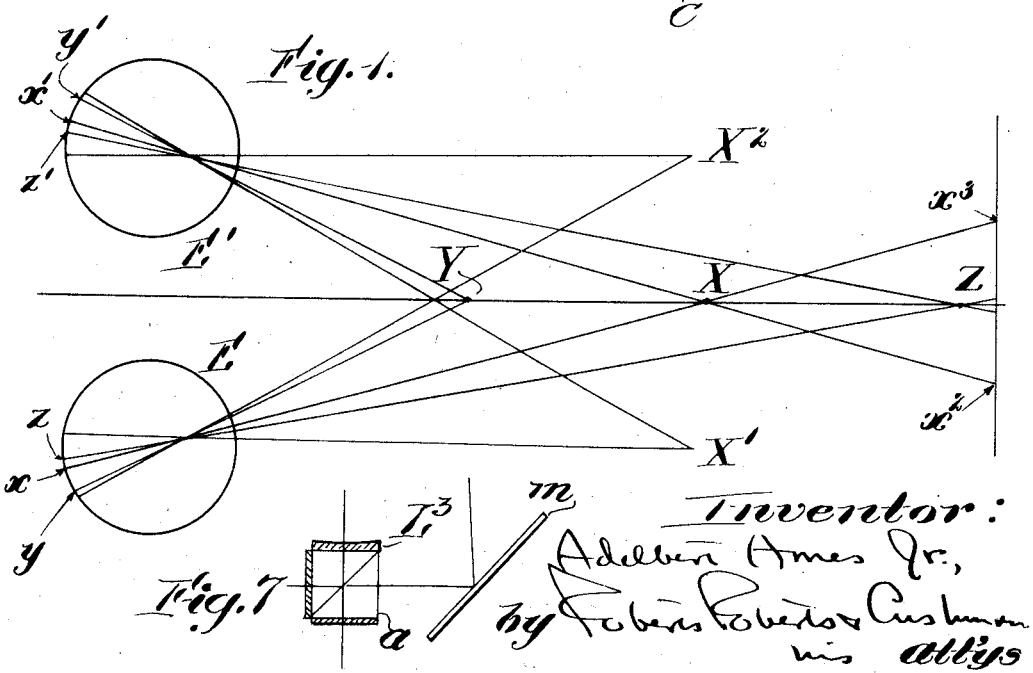

Patented Aug. 17, 1926.

1,595,984

UNITED STATES PATENT OFFICE.

ADELBERT AMES, JR., OF TEWKSBURY, MASSACHUSETTS.

PHOTOGRAPH AND ART OF MAKING THE SAME.

Application filed March 14, 1921. Serial No. 452,273.

This invention relates to a photographic picture having the qualities of selective definition of parts only of the object-field, and having the further qualities of stereoscopic illusion; and to the art of producing such pictures.

The invention includes monochrome or polychrome pictures of the class referred to, the qualities achieved, the principles utilized, and the method employed in or for monochrome pictures being capable of use without change in or for polychrome pictures having two or more color or color-value components arranged for simultaneous or superposed display. The pictures may be motion pictures or still pictures.

It has long been regarded as a desirable object to provide for creating the illusion of stereoscopic vision in perception of the photographic picture, projection or print which is the ultimate object of photography. The ancient way of doing this is to prepare a simultaneous pair or couple of pictures taken by separate, fully-corrected lenses in virtually separate cameras at the same time, the parallel and fixed axes of the lenses being laterally separated at least by the normal distance between the axes of vision of the human eyes, and generally exceeding this separation. Such stereoscopic couples of images as are formed by this expedient make separate pictures of the object field respectively from a fixed point of view of each of a pair of corrected lenses. In order to view these pictures in superposition, so as to obtain approximate illusions of solidity, perspective, and distance of the objects in the picture, the common prior expedient comprised a viewing instrument, generally having divided prismatic lenses, one for each eye of the observer, and a rack for mounted prints of the stereoscopic couple. When viewed through the instrument, sensory accommodation superposes the pictures into one impression, the right eye receiving the sensory impressions of the right-hand picture of the couple and the left hand eye receiving the sensory impressions of the left-hand picture of the couple. These impressions are always essentially false, failing to preserve the characteristics of binocular perception alluded to below.

The projection of such pictures on a screen for entertainment or instruction simultaneously of a number of persons was never practicable under these arrangements; the apparatus was cumbersome; the duplication of negative and print was objectionable on account of its cost and the difficulty of producing accurately related pictures; and such stereoscopic pictures and stereoscopes enjoyed no better vogue than that of a scientific toy of wide distribution and amusing interest, but of very little practical value. Pictures made by such cameras contained no provision for emphasizing by better definition any particular part of the object-field, or for utilizing the inherent aberrations of the optical parts of the instruments to improve the sensory objective effect of the pictures.

A principal object of the present invention is to provide a picture having all of the characteristics of binocular vision; to provide photographs having in one print, transparency or projection, constituting a single photograph, a portrayal of the object in stereoscopic relief, with selective superior definition of a center of interest in the object-field; and to provide for doing this by simultaneous and co-axial superposition of images of the same object-field as viewed from laterally separated points of view, for the purpose of obtaining illusion of binocular vision or stereoscopic effect in the single resultant image. Further objects of the invention are to provide a way of making a composite of two images by the same lens, each image using the full aperture of the lens; and to provide, in the case of polychrome pictures, for duplicating the composite photograph of two such images to obtain in each the selective center-of-interest quality and the stereoscopic effect for the respective colored or monochrome color-value component photographs comprising a simultaneous pair or couple of pictures capable of superposition for simultaneous perception in accurate registry.

In order to be illusive of nature and artistically satisfactory, a photograph should give the appearances of the subjective impression of the retinal image.

I have heretofore described and claimed means for photography reaching the characteristic diffusions and aberrations of normal monocular vision, for which my application for Letters Patent, Serial No.

351,011, filed January 12, 1920 may be consulted. The present invention includes photographs, and the method of making them, in which the subjective mental impression of binocular vision is portrayed, and of which the mental impression upon the observer is that of normal binocular vision of the object portrayed, including characteristics of the binocular sense-impression which have not heretofore, so far as I am aware, been included in any approximation of binocular vision by stereoscopic photography.

In the accompanying drawings,—

Figure 1 is a diagram explanatory of a characteristic of binocular vision;

Figure 2 is a diagram explanatory of one form of apparatus for practicing the method herein referred to;

Figures 3, 4 and 5 are diagrams illustrating some of the characteristics of a picture corresponding to the invention;

Figure 6 is a diagram illustrating further characteristics of such a picture; and Figure 7 is a diagram similar to Fig. 2 showing modified apparatus.

Referring now to Figure 1, the normal binocular sense-impression of the point X by the right eye E and left eye E' will be single, the optical axes of the eyes converging upon X and the images $x$ and $x'$ each lying upon the fovea in the clear-vision center. X is thus the attention-point, the center of interest. But simultaneous vision of the point Y, nearer than X, will be induced by images $y$ and $y'$ lying in the respective eyes one to the right of $x$ and the other to the left of $x$. Similarly, images $z$ and $z'$ of the more distant point Z will lie on the other sides, the left and right respectively, of the center-of-interest image $x$. What perception there is, then, of the objects Y and Z is doubled. When attention is directed to X, the background at the points $x^2$, $x^3$ is occluded by X, but at the images $y$ and $y'$, $z$ and $z'$, the background illumination in one eye overlaps and invades the image-position in the other eye. Therefore, as to X, the eyes see the light parts of X lighter, and the dark parts darker than can be the case with the simultaneous perception of either Y or Z.

The background also invades the duplex-impressions of X' and X$^2$, out of the line of attention and equi-distant with X, for similar reasons.

The right eye sees more of the right side of X, if the object has thickness, than the left eye, and the left eye more of the left side than the right eye.

When we look at X, we know it is further away than Y and not so far as Z in part by unconscious reaction to these duplex, overcast, aberrated and diffused appearances of objects nearer or farther than the center of attention. A true picture of the place X which will give graphic illusion of its distance and rotundity must preserve these characteristics of the sensory impression of its surroundings if it is not to remain a mere intellectual approximation to illusory reality.

I have pointed out in my application above mentioned certain aberrations common to each eye and affecting objects either out of the line of sight, or nearer or farther, when a thing is focused by the eye. These aberrations also affect the composite sensory impression of binocular vision, and further increase the indistinct, aberrant and confused perception of objects anywhere else than at or near the convergent point of the ocular axes.

Heretofore, when stereoscopic representation has been attempted, these factors have not been taken into consideration, the prior efforts, so far as I am aware, all depending upon superposition of images sharply focussed everywhere in the field, and combined in this state by ocular superposition, so that the impression of the picture in its true aspect could be gained only by intellectual effort willfully excluding the false appearances of most of its surface.

Referring now to Fig. 2, said figure illustrates in plan one species of apparatus which I will now mention in aid of explaining the characteristics of photographs of the new genus herein referred to, and the method of making such photographs forming a part of this invention.

Let the object be assumed to be a thing O having rotundity and a position in space, and let it be assumed that the field of view from the point $n$, which may be the nodal point of the photographic lens L, has the lateral angular magnitude represented by the quantity $f$. Within the field of view and at a different distance from the point $n$ than the object O, there are other objects typified by the object $o'$. The surface of the object bears a local marking $o^2$. For simplicity let us assume the object to be spherical and the marking $o^2$ a round spot lying in the general direction of point $n$, and on the optical axis $o^2$, $n$ of lens L.

The lens L is associated with the camera, not shown, in which the light sensitive surface is represented by the plate P.

According to the present method, it is desired to photograph upon the same plate P the simultaneous appearances, from laterally separated points at least as far apart as the normal separation of the ocular axes for binocular vision, of the object field within the lateral dimension $f$, and containing objects along and out of the line of sight at different distances represented by O and $o'$. The object O is the center of interest, and the simultaneous pair of images to be impressed upon the plate P are therefore arranged so that each of them is derived along an axis intersecting at O. In other words, the lines of sight converge at O.

When this is the case, differences between the images due to the phenomena above pointed out of different occlusions of background, different aberrations resulting from fore-and-aft and lateral displacement from the axis, and different appearances due in general to asymmetric or wrong-depth placing of parts of the object field in respect to the respective lines of sight, will be at a minimum at the simultaneous and superposed images of the object O, from the respective points of view, and at a maximum with respect to those objects most displaced from the center of interest in the field of view. The variations from one image to another will in general increase as the image of the object O is departed from.

As indicated in the drawing, apparatus for so disposing superposed simultaneous images on the plate P may comprise 45° prisms $a$, $a'$ having plane surfaces at the third angle of 90°, the hypothenuse surface $g'$ being half-silvered or half-platinized, the whole being arranged in front of the lens L and adapted to receive on the surface $g$ turned toward the lens L reflection from a plane-surface mirror $m$, which can be rotated about its vertical axis $m'$, to control the convergence points in the object field. An indirect image of the object O is thus transmitted coaxially with the direct image through the lens L by reflection from the inner surface of the mirror $g$ and the plane surface of the mirror $m$, and a direct image by transmission through $a$, $a'$. Rotation of the mirror about its axis $m'$ brings the image of any selected object upon which the axis of lens L is turned, such as the object O, through each of these different optical paths into coincidence on the plate P. It will also be understood that for every distance in the line of sight of the object O plate P has a particular position for focus in respect to the nodal point $n$ of the lens L, and the mirror $m$ has a particular position in azimuth. Motions of the plate P and the mirror $m$ may in the apparatus be mechanically related, but I do not herein claim the apparatus illustrated, which is an instance only of many different forms of apparatus which may be employed to practice the method and produce the article herein claimed. In the simple apparatus illustrated in Fig. 2 no provision is made for correcting the longer path and different position of the focussed image of objects reflected at $m$. Quantitatively, for all except close-up objects, this error is negligible. When important, it may be corrected, for instance, by inserting a negative lens $L^3$ in the shorter path, as shown in Fig. 7.

In the particular optical system shown, provision is made for the simultaneous exposure to a pair of overlapped images of a second plate P', upon which an image is formed by a lens L' having its nodal point at $n'$, the nodal points $n$ and $n'$ being symmetrically arranged equidistant from and the axes of the lenses at right angles to each other from the vertical central axis of the prism system $a$, $a'$, $g$. As shown, the axis of lens L' is on the line $n'$, $m'$. For any adjustment of the mirror $m$ the object O and its surroundings may be arranged in respect to their images on the plate P' similarly to such arrangement on the plate P, the images on the plate P' being formed respectively by reflection from the mirror $m$, transmissions through the surface $g$ and lens L'; and by primary reflection from the outer surface of the plane $g$ and lens L. In each case, the light for the components of each composite image respectively reaches the plates P or P' in the same axial relation to the respective lens L or L'. The component images are thus coaxial for each plate.

Under these circumstances any deviation of the superposition of the respective primary and secondary images; any optical aberrations affecting the relation of these images to each other; and any deviation of the center-of-interest point produced by motion of the mirror $m$, or other causes, will be alike and equal so far as the composite effect on plate P and plate P' is concerned.

While the duplication of photographs as indicated may be practised mainly for the sake of two simultaneous photographs, the method of making these is useful in connection with polychrome photographs in which the plate P bears color-value photograph complementary in respect to the color of the image photographed on plate P'. This may be secured by the use of like, photographically equal, and approximately chromatically complementary absorption screens at $s$, and $s'$. While I have referred to the plates P and P', these of course may be continuous films, and the exposures referred to may recur for the purpose of motion picture photographs. The negatives P, P' are printed as positive transparencies, and colored; or viewed or projected in superposition each in light of the color of its screen $s$ or $s'$.

The photographs made at P or P' bear the characteristics of binocular vision pointed out above. With respect to the object O, that direct image which is not reflected in mirror $m$ shows more of the left-hand side of the object O than that indirect image which is reflected in the mirror $m$. In respect to the background, and referring to Fig. 3, the positive direct image as therein shown would, in the explanatory instance given, show the object $o'$ tangent to the object O and to its left, the spot $o^2$ on the object O being to the right of its center. Referring to Fig. 4, the indirect image shows the object $o'$ to the right of the object O, and the spot $o^2$ to the left of its center.

A part of the background $b$ behind the object O appears in the direct image, which is occluded by the object O and does not appear in the indirect image; and in the indirect image a part of the background $b^2$ appears which in the direct image is occluded by the object O. The composite impression, referring now to Fig. 5, thus shows the object O laterally broadened, and shows duplex images of the object $o'$ and of the occluded parts $d$, $d^2$ of the background.

These conditions are in general true for any object nearer or further than the object O; and are also true, see Fig. 1, for objects laterally displaced with respect to the object O.

The result is a composite image imitating the sensory impression of binocular vision, and particularly imitating the characteristic of binocular vision in the symmetrical lack of contrast or light-and-shade values in every part of the field except the center of interest, which effect is due to the vision by each component of duplicating images such as those diagrammed in Fig. 5, the images focused through one optical system being at a different place from the light of the same objects focused by the other optical system. Such images therefore do not register, and flatten out each other everywhere except at and near the center of interest. A photograph so made displays the selected objects at and near intersection of the respective lines of sight in full rotundity, in full difference of light and shade, in good definition, and with the effective characteristics of stereoscopic vision, to the exclusion of the remaining objects in the field of view, which appear diffused, duplicated and aberrated, as they really appear to an observer concentrating upon one object in or region of the field of view. These qualities are diagrammed and indicated, rather than shown, in Fig. 6, which shows one soldier at C picked out of a group of seven in an open landscape for rotund and full representation with the comparative depression, flattening and obscurity of his six neighbors.

I may, and preferably do, heighten the illusion of exact representation of normal binocular vision by employing at L and L' lenses having the characteristic aberrations of the eye, as explained in my said copending application. With such a lens or lenses, the characteristics of appearance of objects out of the attention-point are fully present.

When the pictures are polychrome pictures, as will be the case when two lenses and two sensitive surfaces and the screens $s$, $s'$ are employed, the positives from these sensitive surfaces are displayed in light of the respective colors of the absorption screens $s$, $s'$. It will be observed that difficulty with the fitting relation of the color-value components is avoided. When there is diffusion and failure of registry of the binocular components as described above, these designed failures of registry, as in natural vision, are uniform on plate P as compared with P'. Therefore, whatever the aberrations, duplications of images and other peculiarities of each picture in a color-value pair, the possibility of registering these together is conserved, and there is no misfit overlapping of color from one of the pair of color-value pictures in respect to the color of the other member of the pair.

It will also be observed that the method of forming each of the composite pictures about a single optical axis such as $o^2$, $n$ for lens L', or $m'$, $n'$ for lens L', Fig. 2, utilizes for each component the full aperture of the photographic lens, and that the loss of total illumination of the plate or film is only that due to opacity of the prism-glass at $a$, $a'$, and scattering by the mirror $m$, while the system gains the additional light represented by the rays reflected at $m$.

I claim:

1. The art comprising forming a composite photograph of two superposed views of the same object-field, by superposing images focussed along a single optical axis, the said views differing from each other in accordance with the different aspects of the object-field along lines of sight converging upon a center of interest from points of view laterally separated, one of said points of view being at the nodal point of the image-former.

2. The art comprising forming a composite photograph of two superposed views of the same object-field, the said views differing from each other in accordance with the different aspects of the object-field along lines of sight converging upon a center of interest from points of view laterally separated, the component images being central upon a single axis containing the center of interest and one of said points of view.

3. The art of photography comprising forming normal images on a light-sensitive surface of the appearances of an object-field as viewed along two lines of sight converging at a center of interest, as in normal binocular vision, the photographic impression being formed by superposing one of said images coaxially with and upon another on the said sensitive surface with the images in coincidence at said center of interest.

4. The art of photography comprising forming normal images on a light-sensitive surface of the appearances of an object-field as viewed along two lines of sight converging at a center of interest, as in normal binocular vision, the photographic impression being formed by superposing one of said images upon another on the said sensitive surface, the images of that part of the field at the center of interest being in substantially registering superposition, and in the remainder of the field symmetrically flattened by lack of coincidence.

5. The art of photography comprising forming images on a light-sensitive surface of the appearances of an object field as viewed along the optical axis of the image-former and another line of sight converging at a center of interest, as in normal binocular vision, the photographic impression being formed by superposing one of said images upon another formed by reflection, the images of that part of the field at the center of interest being in substantially registering superposition, the images of the remainder of the field being mutually confused according to the differing positions, aspects, and aberrations in the respective images of the same objects.

6. In the art comprising simultaneously photographing the appearances of an object-field as viewed along two lines of sight converging at a center of interest, said art comprising as a step forming a composite photographic impression composed of images superposed one upon another on the same sensitive surface, the said images of the part of the field at the center of interest being in coincidence, in focus, and co-axial on the same optical axis.

7. The art of photography comprising forming through the same aperture of the same lens coordinate superposed images of the same object-field viewed along optical paths laterally displaced from each other between the lens and a point of convergence defining a center of interest in the object-field one of said optical paths being coincident with the optical axis of the said lens.

8. The art of photography comprising forming through the same lens by light taking different optical paths one of which is co-axial with the lens coordinate images of the same object-field, the point of view for one image being laterally displaced in respect to the other, the respective optical paths being convergent upon a center of interest in the object-field and identical in the image field.

9. The art of photography comprising forming a direct image of the object-field in focus on a sensitive surface in respect to the plane of a center of interest in the object field; forming an indirect image on said surface by reflection from a point laterally displaced in relation to the line between said center and its direct image, and superposing said direct and indirect images with the focal planes of the images and the points therein corresponding to the center of interest in coincidence.

10. The art of photography comprising forming through the full aperture of a lens, with the aid of a partly transmitting and partly reflecting surface, and an auxiliary reflection, upon the same light-sensitive surface, coordinate images of the object-field from two points of view respectively, the lines of sight from said points of view converging at a point in the object-field, and the respective images of said point being coincident upon said sensitive surface.

11. The art of photography comprising forming and exposing light sensitive surfaces to like composite images of an object-field, said composite images being composed of an image of the monocular aspect of the object-field from one point of view, and a superposed image of the monocular aspect of said field from another point of view, the respective component images each including an axial center of interest brought into mutual coincidence by co-axial superposition of said component images.

12. The art of photography comprising simultaneously forming a plurality of composite images on light sensitive surfaces, each of said composite images relating to the same object-field, each component of each of the composite images respectively being an image of the aspect of the object-field from a point of view different from that of the other component of that composite image.

13. The art of photography comprising simultaneously forming two composite images on separate light sensitive surfaces, each of said composite images relating to a binocular view of the same object-field, and each component of each of the composite images respectively comprising the monocular aspect of the object-field from a point of view different from that of the other component of that composite image.

14. The art of photography in color comprising simultaneously forming and subjecting to mutually complementary color absorption two composite images on light sensitive surfaces, each of said composite images relating to a binocular view of the same object field, and each component of each of the composite images respectively comprising the monocular aspect of the object-field from a point of view different from that of the other component of that composite image.

15. The art of photography in color comprising simultaneously forming and subjecting to mutually complementary color absorption two composite images on light sensitive surfaces, each of said composite images relating to a binocular view of the same object-field, and each component of each of the composite images respectively comprising the monocular aspect of the object-field from a point of view different from that of the other component of that composite image, making positives from the negatives so formed, and projecting them in light predominantly of the respective colors in which the said composite images were formed.

16. A photograph comprising a composite of two superposed normal pictures of the same object-field from laterally separated points of view, respectively, and along lines of sight converging at a center of interest in the object-field, the component pictures being co-axial and coincident at the representations of their respective centers of interest.

17. A photograph having therein the composite impression of two superposed images of an object-field, one of said images showing the aspect of the object-field from one point of view and the other showing the aspect of the object-field from a point of view laterally displaced from said first mentioned point of view, said images each being axial upon coincident lines containing the center of interest in the image field.

18. A photograph having therein an impression of the characteristics of binocular vision comprising a well-defined image impression of a center of interest produced by superposed images from different points of view in registering relation, the remainder of the photograph comprising the composite impression of images from the respective points of view, said remainder thereby being out of registry and comparatively vague and diffused.

19. A photograph having therein an impression of the characteristics of binocular vision comprising a picture of a center of interest produced by superposed images from laterally different points of view in registering relation, the remainder of the photograph comprising a composite of the overlapping and mutually inhibitory images from the respective points of view, each of the said images being of the kind produced by a lens having the characteristic aberrations of the ocular lens.

20. A color value photograph comprising a composite picture having therein the monocular aspects of the same object-field from laterally separated points of view superposed and registered only in respect to images of a center of interest upon which the lines of sight from said points of view respectively converge, the composite being subjected to chromatic absorption.

21. A color-value photograph comprising complementary pairs of color-value composites each composite having therein the monocular aspects of the same object-field from laterally separated points of view superposed and registered only in respect to a center of interest upon which the lines of sight from said points of view respectively converge, the composites being subjected respectively to chromatic absorption of complementary colors and being alike in respect to their relation to each other and their component images, and thereby adapted to be registered one with the other without overlapping color fringes.

Signed by me at Boston, Massachusetts, this eighth day of March, 1921.

ADELBERT AMES, Jr.